Patented Oct. 18, 1927.

1,646,339

UNITED STATES PATENT OFFICE.

EUGENE E. AYRES, JR., OF CHESTER, PENNSYLVANIA, ASSIGNOR TO THE SHARPLES SPECIALTY COMPANY, OF PHILADELPHIA, PENNSYLVANIA, A CORPORATION OF DELAWARE.

PROCESS FOR RESOLVING WATER-IN-OIL EMULSIONS.

No Drawing. Application filed April 2, 1921. Serial No. 458,125.

This invention is an improved process for resolving water-in-oil emulsions which comprises essentially the addition to the emulsions of a non-metallic organic reagent, or one that does not contain a metal, which will provide an emulsifying colloid soluble in or wetted by the water to counteract the stabilizing influence of the emulsifying colloid soluble in or wetted by the oil.

It is to be understood that the stability of emulsions is dependent usually on the properties of the colloidal emulsifying agents. If the emulsifying colloid is in the oil, the oil will be continuous with the water dispersed therein, forming a water-in-oil emulsion, but if the emulsifying colloid is in the water, the water will be continuous with the oil dispersed therein, forming an oil-in-water emulsion, and if an emulsion be provided with an emulsifying colloid antagonistic to the emulsifying agent originally present the stability of the emulsion will be reduced and may be destroyed so that separation by settling or centrifugal force can be effected.

The celloids which tend to form emulsions of continuous oil with dispersed water are called herein hydrophobe colloids and the colloids which tend to form emulsions of continuous water with dispersed oil are called herein hydrophile colloids. The form of the emulsion will depend upon the predominating colloid whether, hydrophobe or hydrophile.

It is a primary object of this invention to reduce the stability of or destroy water-in-oil emulsions, particularly industrial emulsions such as those of crude petroleum or those following sulphuric acid treatment in refineries, economically and efficiently, with the capacity for effecting improved results, as for instance the avoidance of ash formations incidental to certain prior processes.

As an illustration of a characteristic application and advantage of my improved process, it is shown that in the refining of petroleum oils with sulphuric acid, the caustic soda that is added to neutralize the acidity of the supernatant oil, after the acid sludge has settled, unites with the acid to form a salt or with organic acid compounds to form organic salts containing sodium. These salts are sufficiently soluble in the oil to give it an appreciable ash which is objectionable and has required a washing operation which is not always effective. While the formation of salts by the caustic soda treatment might be avoided by previously washing out the acid or acid compounds, this is not permissible in industrial operations because the water used in washing forms extremely stubborn emulsions of the type of water-in-oil which cannot ordinarily be separated by gravity or centrifugal subsidence. The emulsion thus formed might be broken by the addition of a trace of sodium soap, but this would introduce the objectionable metal or ash forming substance and the object of the water wash would be lost.

I have found that by the addition of an organic substance that does not contain a metal, preferably gelatine or glue, to the product resulting from water washing the oil so as to remove the acid remaining from the sulphuric acid treatment, the stability of the water-in-oil emulsion can be reduced or destroyed so that separation of the water and oil can be effected by subsidence, either by gravity or centrifugal force.

While glue and gelatine are highly desirable reagents in thus resolving water-in-oil emulsions, there are many other practicable hydrophile colloids containing no metal which can be used, examples of which are albumen, casein, gum arabic and gum tragacanth. As, however, emulsions containing glue or gelatine can be heated without any deleterious effects on the reagent and as these reagents are inexpensive, they are generally preferred but not generally required.

A very small amount of the reagent of this invention has been found sufficient to destroy the stability of emulsions. As an illustration, I have added one-tenth of one per cent by weight of glue, dissolved in a little water, to an emulsion of water-in-oil, stirring the mixture to promote emulsification of the glue solution with the oil emulsion, and centrifuged the product with resulting satisfactory separation of the agglomerated water from the oil.

Having described my invention, I claim:

1. The process of resolving water-in-oil emulsions which consists in adding to the emulsion under treatment sufficient gelatine to coalesce the water dispersed in the oil.

2. The process of resolving petroleum emulsions of water-in-oil which consists in mixing with the emulsion under treatment sufficient gelatine to coalesce water dispersed in the oil and subjecting the product to subsidence.

3. The process of treating petroleum that has been acidified which consists in washing out the acid with water whereby a water-in-oil emulsion is formed, mixing gelatine with the water-in-oil emulsion so as to coalesce the water therein, and separating the coalesced water from the oily by subsidence.

In testimony whereof I have hereunto set my name this 12th day of March, 1921.

EUGENE E. AYRES, Jr.